Patented Jan. 2, 1951

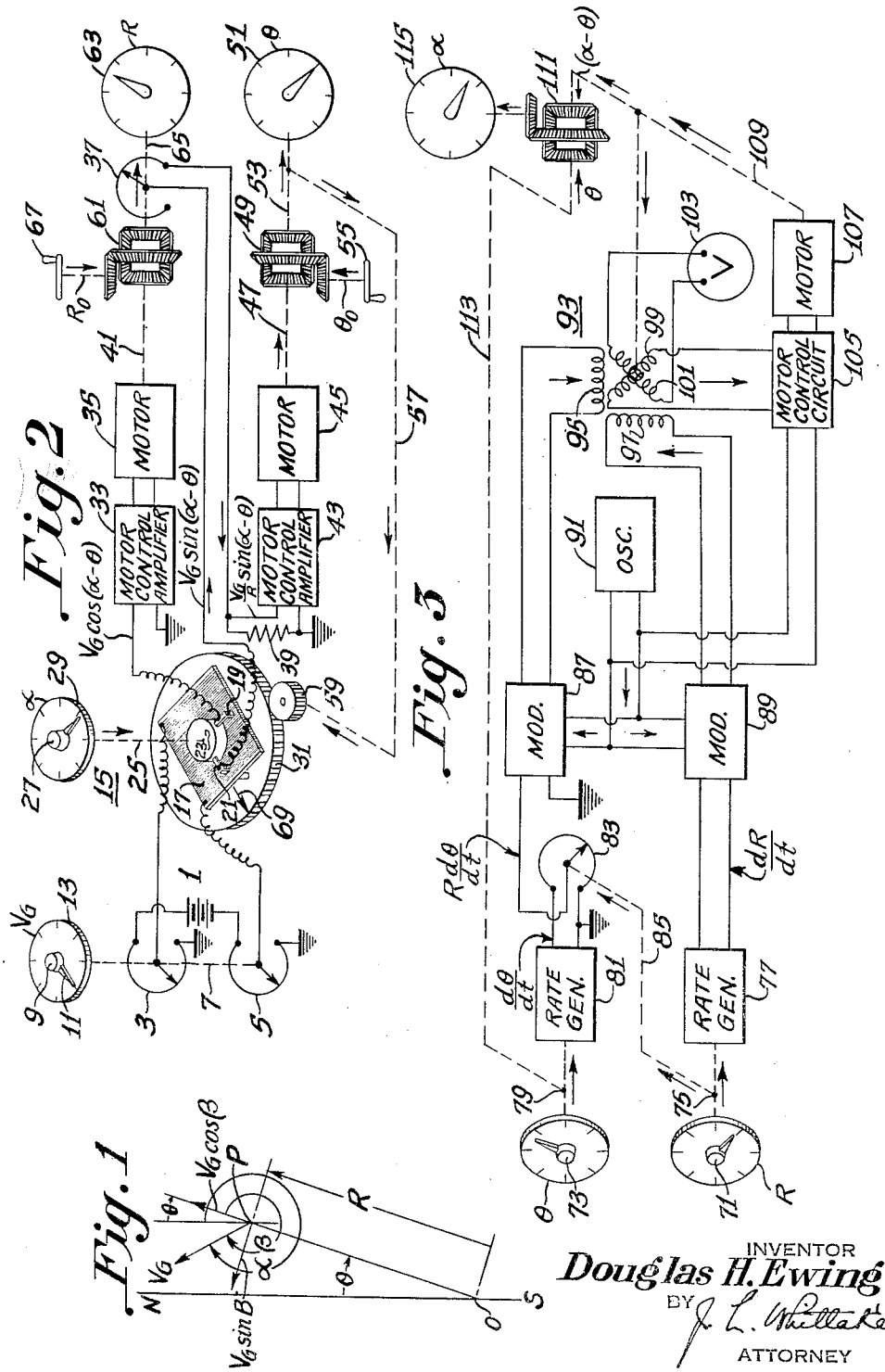

2,536,495

UNITED STATES PATENT OFFICE 2,536,495

FLIGHT SIMULATION SYSTEM

Douglas H. Ewing, Westmont, N. J., assignor to Radio Corporation of America, a corporation of Delaware Application April 30, 1948, Serial No. 24,155

4 Claims. (Cl. 235—61)

This invention relates generally to the representation and control of air traffic, and more particularly to improvements in the art of simulating or depicting the flight of an aircraft.

The principal object of the invention is to provide methods and means for converting continuously one type of representation of flight into another type of representation. For example, the flight of an aircraft can be defined in terms of its starting point (or its position at a certain instant), its ground speed, and heading. The same information can be presented in an entirely different form, such as the direction and radial distance of the craft from a reference point. The latter form of presentation is that ordinarily provided by ground-based radar equipment. The former is similar to that obtained on the aircraft by navigational means.

It is a specific object of the invention to provide systems for converting one of the above-described forms of presentation to the other.

Another object of the invention is to provide systems of the above-described type in which the necessary computations are effected by electrical means, wherein quantities such as speed, distance, and angles are represented by corresponding voltages.

A further object of the present invention is to provide systems of the described type which are simple to design and construct, and rapid and accurate in operation.

The invention will be described with reference to the accompanying drawing, wherein:

Figure 1 is a diagram illustrating the geometry which relates the two above-described forms of presentation, Figure 2 is a schematic diagram of a system converting ground speed and heading information to range and azimuth, i. e. distance and direction information, and Figure 3 is a schematic diagram of a system involving the same principles as that of Figure 2 for converting range and azimuth information to ground speed and heading information.

Refer to Figure 1. It is assumed that an aircraft is at present at the position represented by the point P. The point O is a reference point such as the location of a ground based radar station, and the line N—S is a directional reference line such as the local meridian through the point O.

The position of the craft at the point P is denoted, in polar coordinates referred to the point O, by the range or distance R and the azimuth or direction $\theta$. The ground speed of the craft is designated by the vector $V_G$; the direction of the vector referred to that of the line N—S is the heading, $a$.

If the range $R_0$ and azimuth $\theta_0$ at some particular instant are known or assumed, and the ground speed $V_G$ and heading $a$ are available continuously, the range R and azimuth $\theta$ at any other instant can be determined. The system of Figure 2 provides range and azimuth information continuously in response to continuous ground speed and heading information.

A source 1 of substantially constant voltage is connected to a pair of adjustable voltage dividers 3 and 5, as shown in Figure 2. The movable arms of the voltage dividers 3 and 5 are ganged together, as indicated by the dash line 7, for adjustment by means of a manually operable knob 9. A pointer 11 cooperates with a scale 13 to indicate the adjustment of the voltage dividers in terms of units of ground speed, such as miles per hour.

The movable arms of the voltage dividers 3 and 5 are connected to respective terminals of a component solver device 15. The device 15 includes a "sine card" potentiometer, comprising a flat resistor element 17 and a pair of slidable contacts 19 and 21 in engagement therewith. The terminals of the resistor element 17 are those which are connected to the voltage dividers 3 and 5.

The contacts 19 and 21 are supported at right angles to each other on an insulating member 23 which is rotatable by means of a shaft 25. The shaft 25 is connected to a knob 27 provided with a pointer and scale 29 calibrated in angular measure, such as degrees. The resistor element 17 is also rotatable about the same axis as the shaft 25, being supported upon a gear wheel 31.

The contact 19 is connected to the input circuit of a motor control amplifier 33, which, in turn, is connected to a reversible motor 35. The amplifier 33 and the motor 35 are arranged so that the motor 35 will run in a direction which depends on the polarity of the input to the amplifier 33 and at a speed which is proportional to the voltage applied to the input terminals of the amplifier 33. This may be accomplished in any of several ways known to those skilled in the art; for example, the amplifier 33 may be a D.-C. amplifier, and the motor 35 may be a separately excited or permanent magnet field type device. Various known expedients may be employed to insure that the speed of the motor shall be strictly proportional to the input voltage. Thus, the motor 35 may be provided with a tachometer generator whose output is compared with the input to the amplifier 33 to control the energization of the motor. Since the foregoing is not essential to a clear understanding of the present invention, it need not be described in further detail.

The contact 21 of the component resolver device 15 is connected to a network including a variable resistor 37 and a fixed resistor 39. The movable arm of the resistor 37 is coupled to a shaft 68. The resistor 39 is connected to the input terminals of a motor control amplifier 43, which is similar to the amplifier 33 and is similarly connected to a reversible motor 45.

The output shaft 47 of the motor 45 is coupled through differential gearing 49 to an indicator 51, which is calibrated in angular terms, such as degrees. The differential 49 is arranged to enable the indicator shaft 53 to be adjusted with respect to the motor shaft 47 by means of a hand wheel 55. The indicator shaft 53 is coupled, as indicated by the dash line 57 to a pinion 59 which engages the gear wheel 31. A suitable gear ratio is provided in the coupling between the shaft 53 and the pinion 59 to make the angular rotations of the gear 31 and the shaft 53 equal.

The shaft 41 of the motor 35 is coupled through differential gearing 61 to an indicator 63 calibrated in units of distance, such as miles. The differential 61 is arranged like the differential 49 to allow the indicator shaft 65 to be displaced with respect to the motor shaft 41 by rotations of a hand wheel 67.

In the operation of the above-described system, it is arbitrarily assumed that a certain number of volts represents a ground speed of a certain number of miles per hour. Thus, the quantity miles per hour per volt may be considered as a scale factor of the equipment.

Owing to the connections between the voltage dividers 3 and 5 and the source 1, one movable arm is at a potential positive with respect to ground and the other movable arm is at an equal potential negative with respect to ground. Thus, the voltage across the resistance element 17 is symmetrical with respect to ground and has a magnitude depending upon the adjustment of the knob 9.

The potential with respect to ground at the contact 19 is proportional to the cosine of the angle $\beta$ between said contact and the longitudinal axis (represented by the arrow 69) of the card 17. With the parts in the position shown in Figure 2, said angle $\beta$ is substantially 90 degrees, and the potential at the contact 19 is substantially zero. If either part of the component solver 15 is rotated with respect to the other, the potential with the contact 19 will vary according to the cosine of the angle of rotation.

Similarly, the potential at the contact 21 is proportional to the sine of the angle $\beta$. Assuming that the shaft 25 is rotated clockwise from its fiducial position through the angle $\alpha$ (see Figure 1), and the gear 31 is rotated counterclockwise from its fiducial position through the angle $\theta$, the angle $\beta$ will be $\alpha - \theta$.

Thus, the voltage applied to the motor control amplifier 33 will be proportional to:

$$V_G \cos (\alpha - \theta)$$

This is the radial component of the ground speed vector $V_G$ (Figure 2) and is actually the rate of change of distance of the aircraft from the reference point O.

Since the motor 35 runs at a speed which is proportional to the rate of change of the range R, the total rotation of its shaft 41 is proportional to the total change in R, and the indication displayed on the indicator 63 changes accordingly. In order for the indicator 63 to show the true distance of the aircraft from the reference point, it must be initially adjusted by means of the hand wheel 67 to show $R_0$, the value of R at the point where the craft is located when the operation of the equipment is started.

The potential at the contact 21 of the device 15 is proportional to:

$$V_G \sin (\alpha - \theta)$$

This quantity is the tangential component of the ground speed $V_G$. This voltage is divided by a quantity proportional to R, by means of the voltage divider network which includes the resistor 37 which varies as a function of R. Thus, the voltage applied to the input terminals of the motor control amplifier 43 is proportional to:

$$\frac{V_G}{R} \sin (\alpha - \theta)$$

This quantity is the rate of change of the azimuth angle $\theta$.

The motor 45 rotates at a speed corresponding to said rate and, consequently, turns the shaft 47 through a total angle equivalent to the total change in $\theta$. The azimuth $\theta_0$, corresponding to the position of the aircraft when the operation of the system is started, is introduced by means of the hand wheel 55 so that the indicator 51 will subsequently indicate the true value of $\theta$, as referred to the line N—S in Figure 2.

Since the gear 31 is driven from the shaft 53 as described above, the angle $(\alpha - \theta)$ will be maintained between the parts of the resolver 15, regardless of the variation of $\theta$.

Any changes in ground speed or heading during operation of the system may be inserted by corresponding adjustment of the knobs 9 and 27. The equipment will function continuously to indicate at all times the position of the aircraft in terms of R and $\theta$ referred to the point O. It will be apparent without illustration that the shafts 65 and 53 may be used to drive other indicating mechanism, for example, a "crab," such as is used with pilot training devices to plot a graph of the simulated course followed.

Also, it is within the contemplation of the present invention that the ground speed and heading information may be applied to the system by rotation of the shafts 7 and 25 automatically by measuring instruments or the like, rather than manually.

The system of Figure 3 produces the operational steps of the system of Figure 2 substantially in reverse, providing ground speed and heading information continuously in response to continuous range and azimuth information. For purpose of explanation, it is assumed that the azimuth and range information are available in terms of shaft rotations as by means of manually operable knobs 71 and 73, respectively.

The knob 71 drives a shaft 75 coupled to a rate generator 77 which provides an electrical output corresponding to the rate of change of the range. Thus, when the range R is increasing, the output of the generator 77 will be of one polarity arbitrarily designated as positive, and when the range is decreasing, the output of the generator 77 will be the opposite polarity.

The generator 77 may be a permanent magnet field device, such as a tachometer generator or any other known means functioning as described. The azimuth knob 73 is similarly coupled to a shaft 79 driving a rate generator 81 which provides an output having a magnitude and polarity corresponding to the rate of change $$\frac{d\theta}{dt}$$

of azimuth. The output of the generator 81 is applied to a voltage divider 83 whose movable contact is coupled to the range shaft 75, as indicated by the dash line 85.

The movable contact of the voltage divided 83 is coupled to a modulator 87. The rate generator 77 is coupled directly to a similar modulator 89. Both modulators 87 and 89 are excited by means of an oscillator 91 which may operate at any suitable frequency, for example, 400 cycles per second. The outputs of the modulators 87 and 89 are coupled to respective sets of terminals of a component resolver 93. The component resolver 93 includes orthogonally disposed stator windings 95 and 97 connected respectively to the modulators 87 and 89 and orthogonally disposed rotor windings 99 and 101. The rotor winding 101 is connected to an A.-C. voltmeter 103 calibrated in terms of ground speed (miles per hour). The rotor winding 99 is connected to a motor control circuit 105.

The motor control circuit 105 may be a balanced demodulator which provides an output having a magnitude proportional to the input thereto from the winding 99, and a polarity which depends upon the phase relationship between this input and a reference phase input. The second input to the motor control circuit 105 is supplied by the oscillator 91. The output of the circuit 105 energizes a reversible motor 107.

The output shaft 109 of the motor 107 is coupled to the rotor of the component resolver 93. The shaft 109 is also coupled to one side of a differential gear mechanism 111. The other side of the gear 111 is coupled to the azimuth shaft 109, as indicated by the dash line 113. The spider of the differential 111 is coupled to an indicator 115 calibrated in terms of azimuth (degrees).

In the operation of the system of Figure 3, the rate generator 77 provides an output voltage proportional to the rate of change of range, $$\frac{dR}{dt}$$

This quantity is the radial component $$V_G \cos (\alpha - \beta)$$

of the ground speed $V_G$.

The rate generator 81 provides an output voltage proportional to the rate of change of azimuth, $$\frac{d\theta}{dt}$$

The voltage divider 83 is controlled by the range shaft 85 to modify the output of the generator 81 as a function of range so that the potential which appears at the movable contact of the voltage divider 83 is proportional to the product of the range and the azimuth rate, $$R\frac{d\theta}{dt}$$

This quantity is the tangential component $$V_G \sin (\alpha - \theta)$$

of the ground speed $V_G$.

The modulators 89 and 87 are controlled by the respective rate-proportional inputs and by the 400 cycle oscillator 91 to provide 400-cycle output voltages whose amplitudes are proportional respectively to $V_G \cos (\alpha - \theta)$ and to $V_G \sin (\alpha - \theta)$. These outputs, applied to the orthogonally related windings 97 and 95 of the component resolver 93, produce therein a resultant magnetic field.

The amplitude of the field in the resolver 93 is the vector sum of the component fields produced by the windings 97 and 95, and is proportional to:

$$V_G \cos (\alpha - \theta) + j \sin (\alpha - \theta) = V_G$$

The direction of the resultant field, referred to the axis of the winding 97, is:

$$\tan^{-1} \frac{\sin (\alpha - \theta)}{\cos (\alpha - \theta)} = (\alpha - \theta)$$

The voltage induced by said field in the rotor winding 99 depends upon the angular position of said winding. As long as there is any such voltage, the motor control circuit 105 is actuated to energize the motor 107 to drive the rotor toward a position such that the winding 99 is perpendicular to the resultant field of the stator windings. When the rotor is in this position, no voltage is induced in the winding 99 and the motor stops. A maximum voltage, proportional to the amplitude of the resultant stator field and thus proportional to $V_G$, is induced in the winding 101. This voltage is indicated, in terms of ground speed, by the meter 103.

With the rotor positioned as described, the motor shaft 109 is at an angle $(\alpha - \theta)$ with respect to the its reference position. The differential gear 111 is rotated through this angle on one side by the shaft 109. The other side of the differential is rotated through the angle $\theta$ by the shaft 113. The output shaft of the differential rotates through the sum of these angles, which is the angle $\alpha$, and operates the indicator 115 to indicate heading.

As mentioned in connection with the description of Figure 2, the input information may be supplied continuously, either manually or by automatic means rotating the range and azimuth shafts, and the current heading and ground speed information may be simply indicated as described or may be used to actuate other equipment.

The described invention affords accurate and relatively simple electrical systems for converting between one type of flight information, such as that provided by radar, to another type of information, such as that provided by airborne navigational instruments.

I claim as my invention:

1. In a flight simulator or the like, range and azimuth shafts to be driven in accordance with respective positional coordinates, with respect to a reference point, of an aircraft, electro-mechanical transducers coupled to said range and azimuth shafts respectively, a component solver device including two relatively movable parts, the first of said parts including one set of terminals connected to said range shaft transducer and a second set of terminals connected to said azimuth shaft transducer, said last-mentioned connection including variable voltage divider means coupled to said range shaft; means for rotating said parts of said component resolver with respect to each other in accordance with the heading of said aircraft with respect to a radial line from said reference point to said craft; a heading shaft to be driven in accordance with the heading of said craft with respect to a fixed reference line such as a meridian through said reference point, and means mechanically coupling said heading shaft to the second of said parts of said component resolver device, said last-mentioned part including at least one set of terminals, and means determining the voltage across said terminals in terms of the ground speed of said aircraft.

2. In a flight simulator or the like, two shafts, electro-mechanical transducers coupled to said first and second shafts respectively, a component solver device including two relatively movable parts, the first of said parts including one set of terminals connected to said first transducer and a second set of terminals connected to said second transducer, variable voltage divider means coupled to said first shaft and electrically coupled to said last-mentioned connection; means for rotating said parts of said component resolver with respect to each other; a heading shaft and means mechanically coupling said heading shaft to the second of said parts of said component resolver device, said last-mentioned part including at least one set of terminals, and means determining the voltage across said terminals.

3. In a flight simulator or the like, range and azimuth shafts to be driven in accordance with respective positional coordinates, with respect to a reference point, of an aircraft, rate generators coupled to said range and azimuth shafts respectively, a component solver device including two relatively movable parts, the first of said parts including one set of terminals connected to said range rate generator and a second set of terminals connected to said azimuth rate generator, said last-mentioned connection including variable voltage divider means coupled to said range shaft; means including a follow-up system for rotating one part of said component resolver with respect to the other in accordance with the ratio of the volages applied to said terminals from said rate generators; a heading shaft and means including differential gearing mechanically coupling said heading shaft to the second of said parts of said component resolver device, and to said azimuth shaft, said last-mentioned part including at least one set of terminals, and means indicating the voltage across said terminals.

4. In a flight simulator or the like, range and azimuth shafts, rate generators coupled to said range and azimuth shafts respectively, a component solver device including two relatively movable parts, the first of said parts including one set of terminals connected to said range rate generator and a second set of terminals connected to said azimuth rate generaor, said last-mentioned connection including variable voltage divider means coupled to said range shaft; means for rotating one part of said component resolver with respect to the other in accordance with ratio of the magnitudes of the voltages suplied thereto by said rate generators; a heading shaft and means mechanically coupling said heading shaft to the second of said parts of said component resolver device, said last-mentioned part including at least one set of terminals, and means determining the voltage across said terminals in terms of the ground speed of said aircraft.

DOUGLAS H. EWING.

REFERENCES CITED

The following references are of record in the file of this patent:

UNITED STATES PATENTS

| Number | Name | Date |
| --- | --- | --- |
| 2,465,624 | Agins | Mar. 29, 1949 |
| 2,467,646 | Agins | Apr. 17, 1949 |